(12) United States Patent
Jander

(10) Patent No.: US 7,134,371 B2
(45) Date of Patent: Nov. 14, 2006

(54) APPARATUS FOR GUIDING CONTINUOUS FIBERS

(75) Inventor: Michael H. Jander, Eupen (BE)

(73) Assignee: Owens Corning Composites SPRL, Brussels (BE)

( * ) Notice: Subject to any disclaimer, the term of this patent is extended or adjusted under 35 U.S.C. 154(b) by 561 days.

(21) Appl. No.: 09/952,745

(22) Filed: Sep. 13, 2001

(65) Prior Publication Data

US 2003/0046961 A1    Mar. 13, 2003

(51) Int. Cl.
B23D 25/12    (2006.01)
(52) U.S. Cl. ............... 83/331; 83/346; 241/186.35; 241/159
(58) Field of Classification Search ............... 83/331, 83/343, 346, 155, 913; 241/186.35, 280, 241/159, 227
See application file for complete search history.

(56) References Cited

U.S. PATENT DOCUMENTS

| | | |
|---|---|---|
| 1,307,761 A | 6/1919 | Shelton |
| 2,150,984 A | 3/1939 | Near et al. |
| 2,690,628 A | 10/1954 | Courtney et al. |
| 2,808,884 A | 10/1957 | Shann et al. |
| 2,974,554 A | 3/1961 | Schurmann et al. |
| 3,050,427 A | 8/1962 | Slayter et al. |
| 3,110,209 A | 11/1963 | Takehara |
| 3,293,013 A | 12/1966 | Drummond |
| 3,334,533 A | 8/1967 | Davis |
| 3,584,476 A | 6/1971 | Wynne |
| 3,744,361 A | 7/1973 | Van Dom et al. |
| 3,754,880 A | 8/1973 | Henderson et al. |
| 3,837,584 A * | 9/1974 | Lehr et al. ............ 241/65 |
| 3,873,290 A | 3/1975 | Marzocchi |
| 3,943,805 A * | 3/1976 | Lubitzsch ............ 83/23 |
| 4,059,235 A | 11/1977 | Bryant |
| 4,071,339 A | 1/1978 | Griffiths |
| 4,119,277 A * | 10/1978 | Snyder et al. ............ 241/167 |
| 4,309,000 A | 1/1982 | Schefer et al. |
| 4,351,459 A | 9/1982 | Huey-Miin |
| 4,369,681 A | 1/1983 | Van Doorn et al. |
| 4,480,516 A * | 11/1984 | Leroy ............ 83/98 |
| 4,551,160 A | 11/1985 | Frailey et al. |
| 4,591,106 A | 5/1986 | Gay |
| 4,682,523 A | 7/1987 | Johnston et al. |
| RE33,111 E | 11/1989 | Niederer |

(Continued)

FOREIGN PATENT DOCUMENTS

BE    656 220 A    5/1965

(Continued)

*Primary Examiner*—Boyer D. Ashley
*Assistant Examiner*—Omar Flores Sanchez
(74) *Attorney, Agent, or Firm*—Inger H. Eckert; Margaret S. Millikin

(57) ABSTRACT

The present invention is directed towards an apparatus for guiding continuous materials. In one embodiment of the invention, the apparatus comprises first and second conveyors, each comprising a continuous conveyor belt carried by a set of pulleys including a drive pulley and an idler pulley. The conveyor belts have opposing inner surfaces that are oriented to travel substantially parallel to one another to sandwich continuous materials therebetween. The ratio of the diameters of the idler pulleys to the drive pulleys is greater than about 8:1. In another embodiment of the invention, a chopper is provided. The chopper comprises a cutting roll and a cot member defining a nip region therebetween. The cutting roll has an axis of rotation that is aligned substantially parallel to an axis of rotation of a cot member. The small turning radii permit the conveyor belts to extend within the nip region.

9 Claims, 9 Drawing Sheets

U.S. PATENT DOCUMENTS

| | | | |
|---|---|---|---|
| 5,103,703 A | * 4/1992 | Littleton | 83/155 |
| 5,301,582 A | * 4/1994 | Bragaglia | 83/338 |
| 5,678,774 A | 10/1997 | Bennett et al. | |
| 5,697,560 A | 12/1997 | Bennett | |
| 5,740,709 A | * 4/1998 | Boston et al. | 83/308 |
| 5,779,793 A | 7/1998 | Sand | |
| 5,954,278 A | 9/1999 | Bennett et al. | |
| 5,970,837 A | 10/1999 | Arterburn et al. | |
| 6,062,048 A | 5/2000 | Arterburn et al. | |
| 6,076,442 A | 6/2000 | Arterburn et al. | |
| 6,138,544 A | 10/2000 | Newell | |

FOREIGN PATENT DOCUMENTS

| | | |
|---|---|---|
| DE | 11 44 442 B | 2/1963 |
| JP | 61-44971 | 5/1994 |
| JP | 61-70018 | 6/1994 |

* cited by examiner

APPARATUS FOR GUIDING CONTINUOUS FIBERS

TECHNICAL FIELD AND INDUSTRIAL APPLICABILITY OF THE INVENTION

This invention relates in general to an apparatus for processing continuous materials, and in particular, to an apparatus for guiding continuous materials while being processed. Most particularly, the invention relates to an apparatus for guiding continuous materials to a chopper.

BACKGROUND OF THE INVENTION

Continuous glass fibers are formed by extruding molten glass through a bushing and attenuating the extruded molten glass. Formation of the fibers also normally involves treating the fibers with a size to enhance the properties of the fibers in subsequent operations. The resultant fibers, after solidifying, may then be directed to another area for fabrication into desired products, or collected as a package for storage prior to further processing.

Strands are formed from a plurality of glass fibers arranged adjacent to one another. Rovings are formed from a plurality of strands. Strands and rovings are often used to further form yarns and tows. Other products, such as tapes, ribbons, scrims, webs, and veils, are also formed from glass fibers. When fiberglass packages are formed, the glass fibers, or products formed therefrom, are wound onto a tube utilizing various methods and apparatus.

Continuous materials, such as fibers or fiber products, are often cut into discrete lengths in a process involving a chopping operation. In a chopping operation, the continuous materials are conveyed along a pathway into engagement with a chopper. A chopper includes a cutting roll that rotates about an axis that is perpendicular or transverse to the path of the continuous materials. The cutting roll is comprised of a steel roll with a plurality of spaced cutting blades projecting radially outwardly from, and generally parallel to, the axis of the steel roll. The cutting blades can be oriented so that the blades cut the continuous materials longitudinally and transversely relative to the pathway of the continuous materials being cut. The cutting roll cooperates with a backup roll or cot roll to cut or chop the continuous materials as they pass through the nip between the cutting roll and the cot roll to produce segments of chopped materials having discrete lengths. The chopped materials are discharged downstream of the cutting blades.

The continuous materials are guided into the cutting blades by an apparatus, which includes a guide roll or belt. The guide roll or belt cooperates with a support plate, roll, or belt to guide and control the continuous materials through the nip between the cutting and cot rolls. This cooperative arrangement is deficient because the guide roll or belt tends to slip relative to the support plate, roll, or belt. This slippage produces friction that causes the continuous materials to slip. This causes the size in the continuous materials to break down. When the size breaks down, it causes the continuous materials to stick to the guide roll or belt. Consequently, the continuous materials wrap around the guide roll or belt.

What is needed is an apparatus for guiding continuous materials, which has a reduced tendency to cause size in the continuous materials to break down and thus become sticky.

SUMMARY OF THE INVENTION

The above objects as well as other objects not specifically enumerated are achieved by apparatus for guiding continuous materials, the apparatus including a first conveyor and a second conveyor. The first conveyor is comprised of a first continuous conveyor belt having an inner surface. The first conveyor is carried by a first set of pulleys including a drive pulley and an idler pulley. The second conveyor is comprised of a second continuous conveyor belt having an inside surface that is substantially parallel to the inner surface of the first conveyor belt. The second conveyor belt is carried by a second set of pulleys including a drive pulley and an idler pulley. The conveyor belts are oriented to sandwich continuous materials therebetween. The ratio of the diameters of the idler pulleys to the drive pulleys is greater than about 8:1.

According to this invention, there is also provided apparatus for guiding continuous materials, the apparatus including a first conveyor and a second conveyor. The first conveyor is comprised of a first continuous conveyor belt carried by a first set of pulleys including a drive pulley and an idler pulley. At least one pulley of the first set of pulleys has a small turning radius. The second conveyor is comprised of a second continuous conveyor belt in a substantially parallel spaced relation to the first conveyor belt. The second conveyor belt is carried by a second set of pulleys including a drive pulley and an idler pulley. At least one pulley of the second set of pulleys has a small turning radius. The conveyor belts are oriented to travel substantially parallel to one another to sandwich the continuous materials therebetween. The apparatus further includes a chopper comprising a cutting roll and a cot roll defining a nip region therebetween. The small turning radii permit the conveyor belts to extend within the nip region.

According to this invention, there is also provided apparatus for guiding continuous materials, the apparatus comprising a frame, a first conveyor, a second conveyor, a chopper, and means for driving pulleys. The first conveyor is comprised of a first continuous conveyor belt carried by a first set of pulleys including a drive pulley and an idler pulley. The first set of pulleys is rotatably supported on the frame. At least one pulley has a small turning radius. The second conveyor is comprised of a second continuous conveyor belt in a substantially parallel spaced relation to the first conveyor belt. The second conveyor belt is carried by a second set of pulleys including a drive pulley and an idler pulley. The second set of pulleys is rotatably supported on the frame. At least one pulley of the second conveyor has a small turning radius. The conveyor belts have inner surfaces that are oriented to travel substantially parallel to one another to sandwich the continuous materials therebetween. The ratio of the diameters of the idler pulleys to the drive pulleys is greater than about 8:1. The apparatus further includes a chopper comprises a cutting roll and a cot roll rotatably supported by the frame. The cutting roll is rotatably mounted on an axis of rotation and a cot roll that is rotatably mounted on an axis of rotation that is substantially parallel to the axis of rotation of the cutting roll. The small turning radii of the drive pulleys permit the conveyor belts to extend within the nip region.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
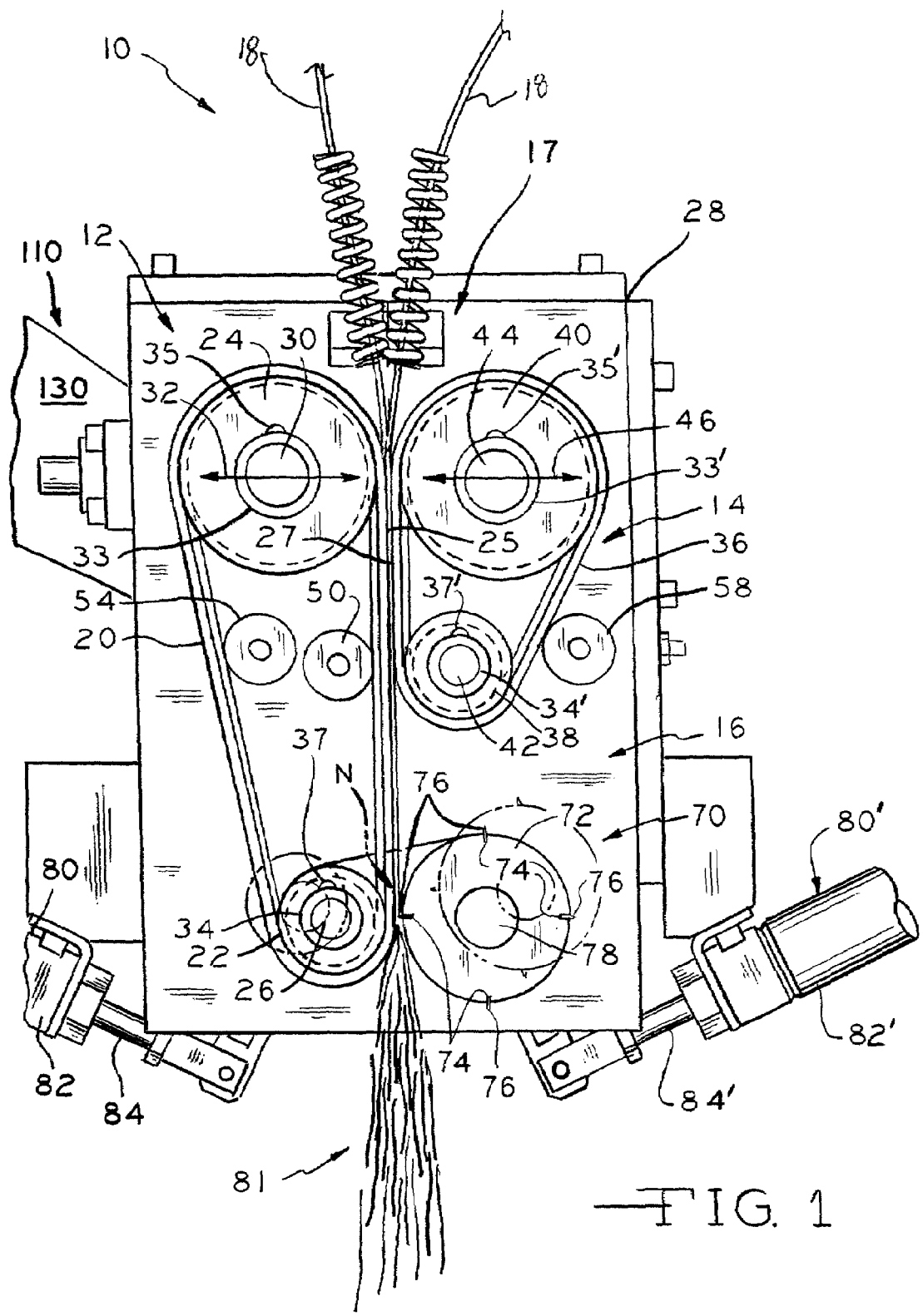
FIG. 1 is a partial front elevational view of an apparatus according to the present invention for use in collecting uncut continuous materials and producing chopped materials.
Figure 2:
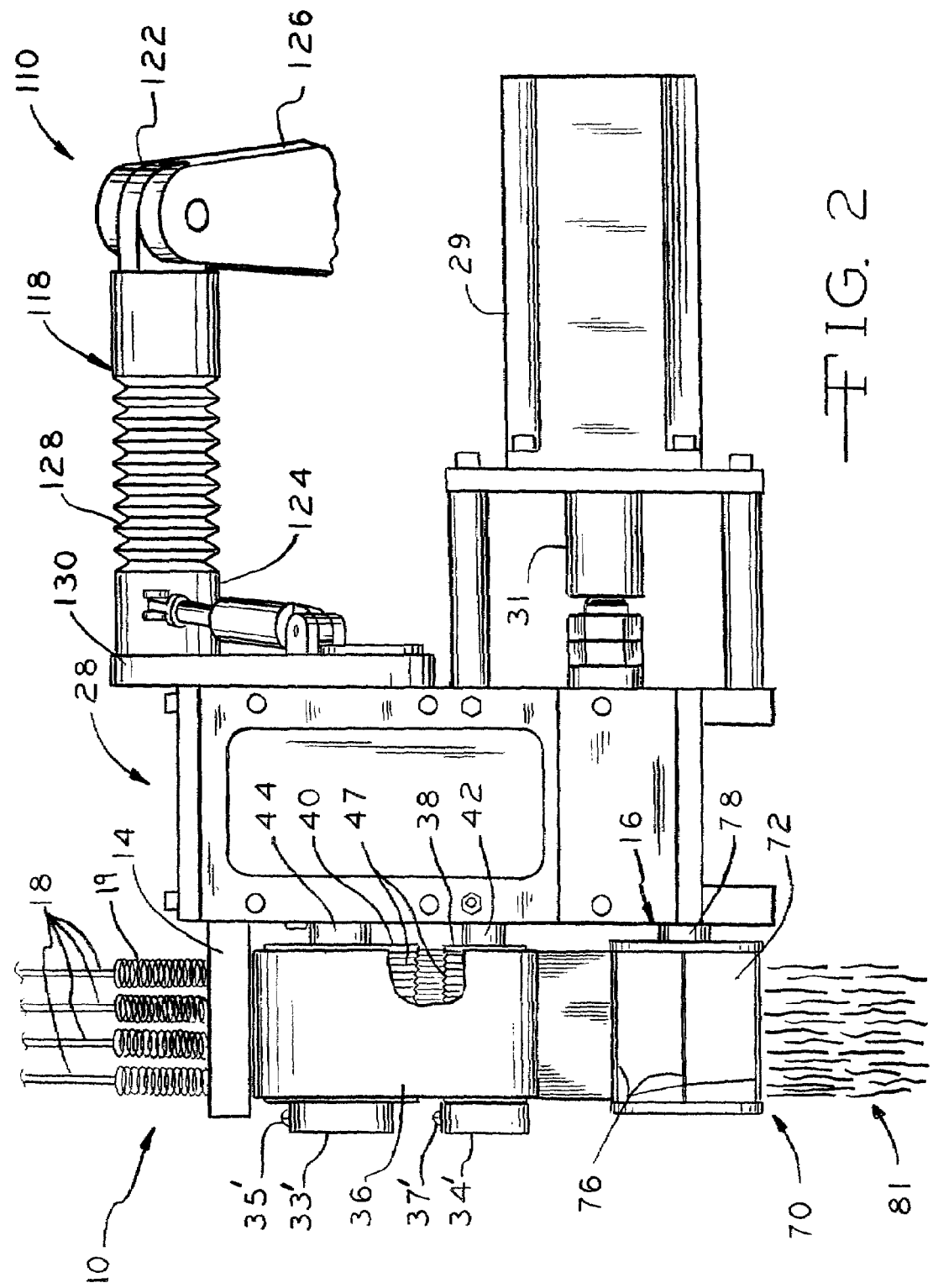
FIG. 2 is a partial side elevational view of the apparatus shown in FIG. 1 with opposing actuators removed to simplify the drawing.

Referring now to the drawings, there is illustrated in FIGS. 1 and 2 an apparatus 10 for collecting uncut continuous materials 18 and producing chopped materials 81. The apparatus basically comprises a chopper, generally indicated at 16, and a guide assembly, generally indicated at 17, and includes a movable frame 28 for supporting the guide assembly, cutting roll 70 and cot member as further described below. The guide assembly 17 preferably includes a first conveyor, generally indicated at 12, and a second conveyor, generally indicated at 14, which cooperate to drive continuous materials 18 into and through the chopper 16. It should be appreciated that continuous materials 18 in the context of this description include but are not limited to fibers, strands, rovings, yarns, tows, tapes, webs, veils, and scrims. Continuous materials 18 may be natural materials, synthetic materials, such as polymer fibers, or inorganic materials, such as glass fibers. It should also be appreciated that the various embodiments of the apparatus described herein are provided for illustrative purposes and that other apparatus may be suitable for carrying out the invention.

The first conveyor 12 is comprised of a first continuous conveyor belt 20. The first conveyor belt 20 is carried by a first set of pulleys 22 and 24, including a drive pulley 22 and an idler pulley 24. The pulleys 22 and 24 are supported by corresponding shafts 26 and 30, including a drive pulley shaft 26 and an idler pulley shaft 30. These shafts 26 and 30 each have a hub 33 and 34 attached thereto with a setscrew 35 and 37. The hubs 33 and 34 are provided for holding the pulleys 22 and 24 on the shafts 26 and 30. The shafts 26 and 30 are mounted for rotation relative to the frame 28. Drive means is provided for rotating the drive pulley shaft 26 to drive the drive pulley 22. The drive pulley 22 is driven to carry an inner surface 25 of the first conveyor belt 20 in the direction of the chopper 16. The idler pulley shaft 30 is preferably mounted for rotation to the frame 28 by an adjustable block (not shown). The adjustable block is provided to permit the idler pulley 24 to be adjusted along the line 32.

The second conveyor 14 is constructed similarly to the first conveyor 12. For example, the second conveyor 14 is comprised of a second continuous conveyor belt 36. The second conveyor belt 36 is carried by a set of pulleys 38 and 40, including a drive pulley 38 and an idler pulley 40. These pulleys 38 and 40 are supported by corresponding shafts 42 and 44, including a drive pulley shaft 42 and an idler pulley shaft 44. These shafts 42 and 44 each have a hub 33' and 34' attached thereto with a setscrew 35' and 37'. The hubs 33' and 34' are provided for holding the pulleys 38 and 40 on the shafts 42 and 44. These shafts 42 and 44 are mounted for rotation relative to the frame 28. Drive means is provided for rotating the drive pulley shaft 42 to drive the drive pulley 38. The drive pulley 38 is driven to carry an inner surface 27 of the second conveyor belt 36 in the direction of the chopper 16. The idler pulley shaft 44 is preferably mounted for rotation relative to the frame 28 by an adjustable block (not shown). The adjustable block is provided to permit the idler pulley 40 to be adjusted along the line 46.

In a preferred embodiment of the invention, the inner surface 25 of the first conveyor belt 20 is preferably in a substantially parallel spaced relation to the inner surface 27 of the second conveyor 36. These inner surfaces 25 and 27 are preferably aligned with the exit end of the pull wheels (not shown) that supply the continuous materials 18 to the guide members 19 of the guide assembly 17. The purpose of this parallel spaced relation is to grip the continuous material 18 and drive the continuous material 18 toward the chopper 16.

The conveyor belts 20 and 36 are preferably formed of a rubber having an outer polyurethane cover bonded thereto. A polyurethane cover is preferred because it has a high coefficient of friction to grip the continuous material 18. The cover should also have a high tensile strength to resist wear. The belts 20 and 36 preferably have a multiple V-shaped pulley engaging surface that meshes with a mating surface 47 on the pulleys 22, 24, 38, and 40. This meshing configuration reduces the risk that the belts 20 and 36 will slip on the pulleys 22, 24, 38, and 40 and insures belt tracking.

It should be appreciated that the first and second conveyor belts 20 and 36 may be driven by the same drive means or a separate drive means. The belts 20 and 36 shown are driven by the same drive means. The drive means is comprised of a motor 29 coupled to a gear train (not shown) by a coupling 31 (shown in FIG. 2). The gear train rotates the drive pulley shafts 26 and 42 to drive the drive pulleys 22 and 38. For safety purposes, the gear train is preferably contained within the frame 28.

Adjustment means is preferably provided to adjust the position relative to one another to adjust the pressure against the continuous materials 18. The adjustment means may be in the form of an adjustable pulley that is adapted to displace the conveyor belts 20 and 36. For example, an adjustable pulley 50 may be provided for displacing the first conveyor belt 20 in a direction toward and away from the second conveyor belt 36, thereby adjusting the position of the conveyor belts 20 and 36 relative to one another. This is important to set a gap between the conveyor belts 20 and 36.

Adjustment means is also preferably provided to adjust the tension of the conveyor belts 20 and 36. This is important because the conveyor belts 20 and 36 stretch during use. This adjustment means may be in the form of a tension pulley that is adapted to displace the conveyor belts 20 and 36. For example, a first tension pulley 54 may be provided for displacing the first conveyor belt 20 to adjust the tension of the first conveyor belt 20. Similarly, a second tension pulley 58 may be provided for displacing the second conveyor belt 36 to adjust the tension of the second conveyor belt 36.

The chopper 16 is comprised of a cutting roll 70 and a backup or cot member rotatably supported by the frame 28. The cutting roll 70 is preferably comprised of a steel roll 72 having a plurality of equidistantly spaced slots 74. Each slot 74 supports a cutting blade 76. Each blade 76 has a revealed portion that extends radially outwardly from the cylindrical surface of the cutting roll 70. The revealed portion is provided for cutting the continuous material 18. The cot member is provided for backing up the cutting roll 70 when cutting continuous material 18. The cot member may be in the form of a belt, as shown in FIGS. 1–5, or a roll, as shown in FIG. 6. The cot belt shown in FIGS. 1–4 is an extension of the first conveyor belt 20, i.e., the first conveyor belt 20 provides a backup surface for the blades 76 when cutting the continuous materials 18. In other words, the first conveyor belt 20 is extended to engage the cutting roll 70, as shown in FIGS. 1–4, and thus functions as a cot belt. Another cot belt 86 is shown in FIG. 5. This belt is independent of the first conveyor belt 20 shown in FIGS. 1–4. An example of a cot roll 77 is shown in FIG. 6. A cot roll 77 is used in place of a cot belt and vice versa.

The belts 20 and 86 shown in FIGS. 1–5 differ from one another. For example, the first conveyor belt 20 shown in FIG. 1 extends only as far as the cutting roll 70. Whereas, the conveyor belt 20 shown in FIGS. 3 and 4 extends beyond the cutting roll 70 so that it actually wraps around a portion of the cutting roll 70. The cot belt 86 shown in FIG. 5 also extends beyond the cutting roll 70. The cot belt 86 shown in FIG. further differs from the cot belt shown in FIGS. 1–4 in that the cot belt 86 shown in FIG. 5 is carried by an independent set of pulleys, including a drive pulley 88 and an idler pulley 90. These pulleys 88 and 90 are supported by corresponding shafts 92 and 94, including a drive pulley shaft 92 and an idler pulley shaft 94. These shafts 92 and 94 each have a hub 93 and 95 attached thereto with a setscrew 97 and 99. The hubs 93 and 95 are provided for holding the pulleys 88 and 90 on the shafts 92 and 94. These shafts 92 and 94 are mounted for rotation relative to the frame 28. Drive means is provided for rotating the drive pulley shaft 92 to drive the drive pulley 88. It may be seen that the cot belt 86 will act as a backup member for the cutting roll 70 in a manner similar to the cot belts shown in FIGS. 1–4.

Figure 3:
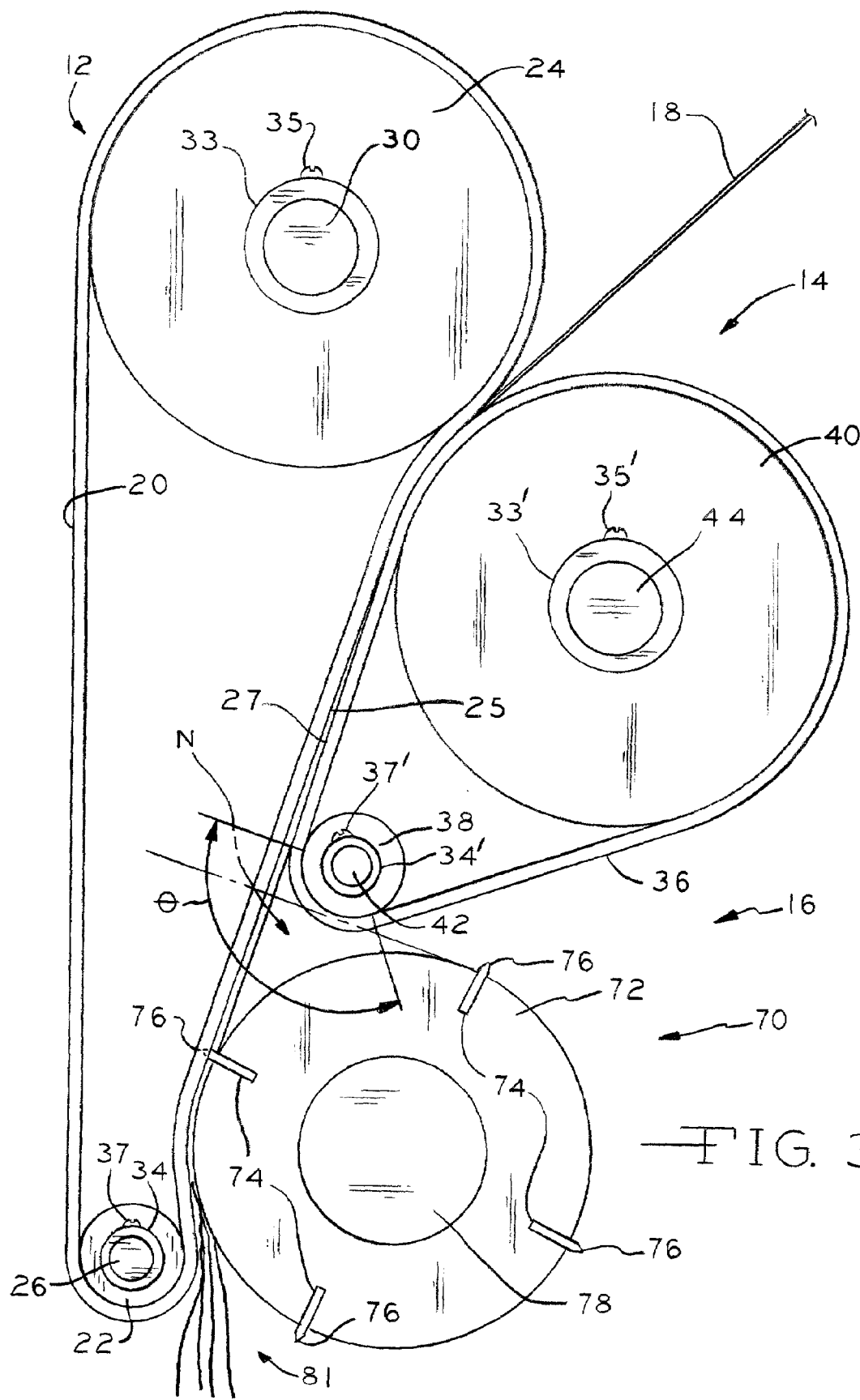
FIG. 3 is a diagrammatic representation of an apparatus according to another embodiment of the invention.
Figure 4:
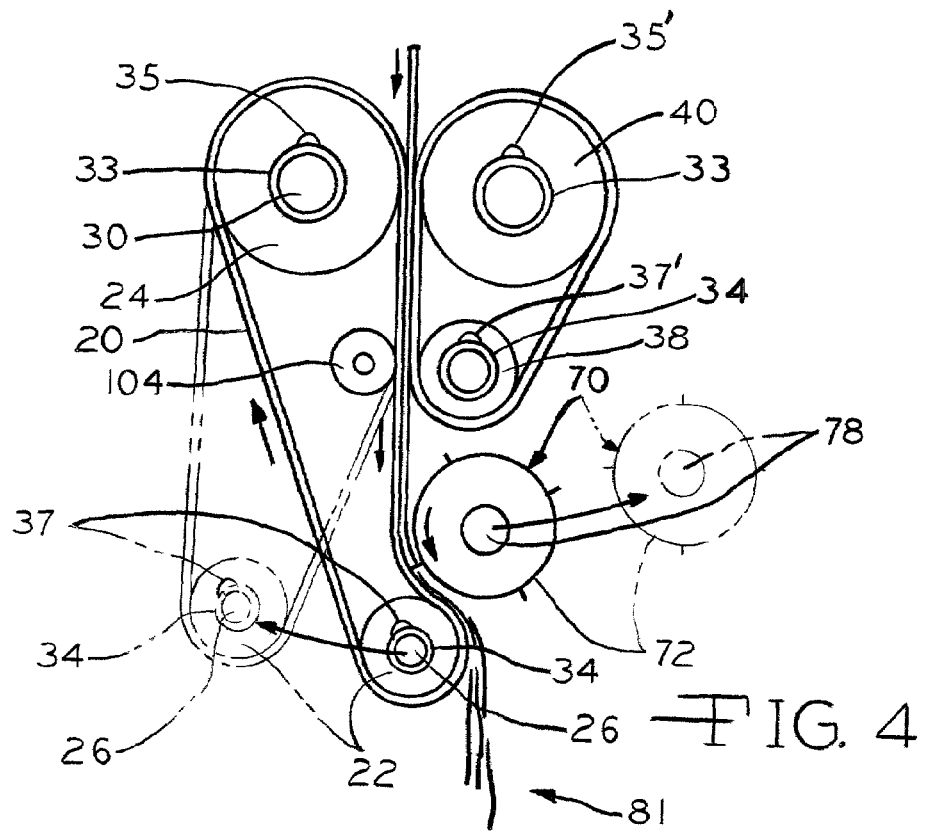
FIG. 4 is a diagrammatic representation of an apparatus according to another embodiment of the invention.
Figure 5:
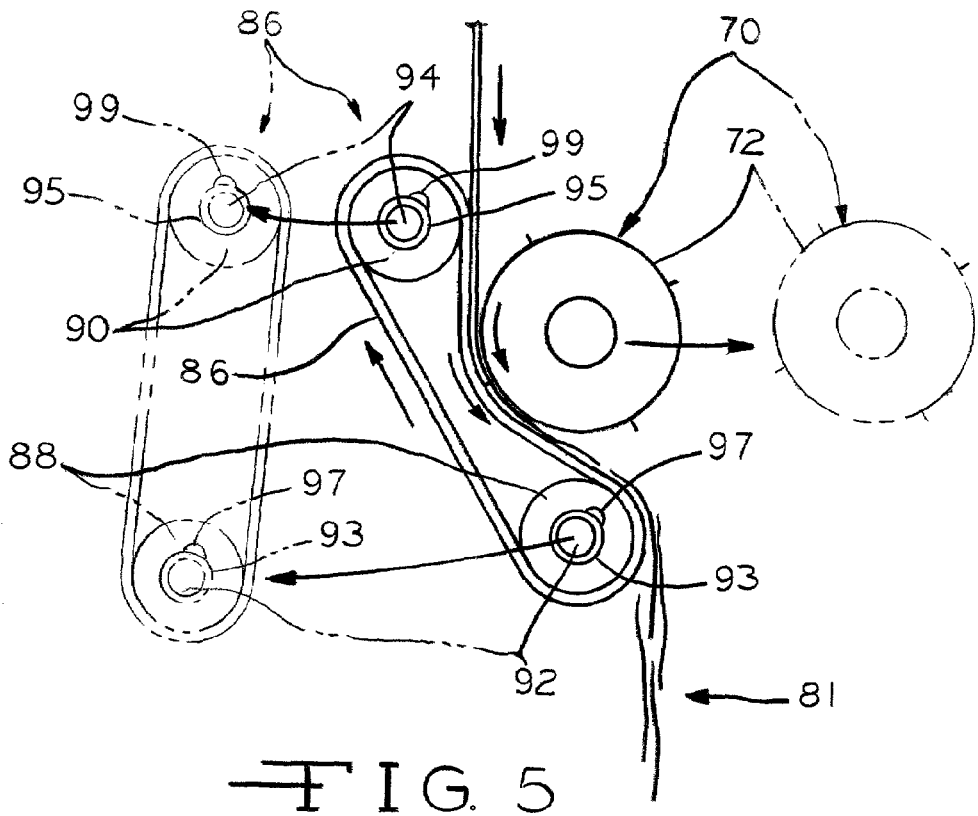
FIG. 5 is a diagrammatic representation of an apparatus according to yet another embodiment of the invention.
Figure 6:
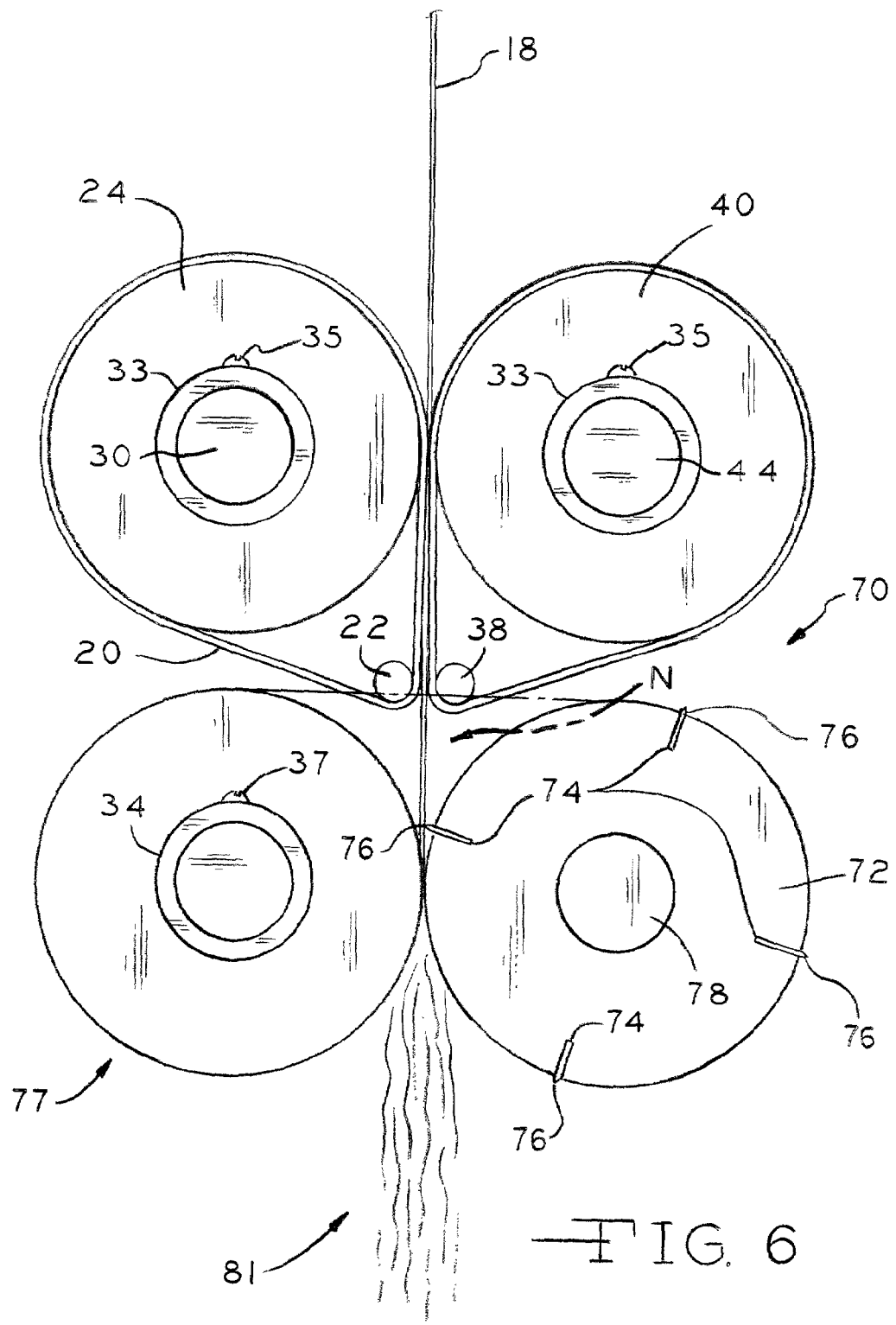
FIG. 6 is a diagrammatic representation of an apparatus according to still another embodiment of the invention.

In the belts shown in FIGS. 3–5, the cutting roll 70 is positioned relative to the drive pulleys 22 and 88 and the idler pulley 24 and 90 in such a manner as to cause the cutting roll 70 to intercept the path of the belt 20 and 86, causing the belt 20 to bend or partially wrap around the cutting roll 70. The result of this positioning of the belt 20 is to increase the contact area between the belt 20 and the cutting roll 70. As shown in FIG. 1, the contact area is a tangent point, whereas, as shown in FIGS. 3–5, the contact area is a circumferential arc. By using the belts 20 and 86 in a wrap around mode as shown in FIGS. 3–5, the angle of the cutting blades 76 with respect to the belts 20 and 86 is held substantially constant as the cutting blades 76 make successive strokes against the belts 20 and 86. The angle of the blade 76 is held substantially constant with respect to the belts 20 and 86 because the belts 20 and 86 are flexible and conform to the curved shape of the cutting roll 70, as shown in FIGS. 3–5.

Cot belts may encounter less wear than a cot roll because a cot roll is not as flexible as a cot belt and consequently does not conform to the curved shape of the cutting roll 70, as does a cot belt. When using a cot roll, the blades 76 of the cutting roll 70 first approach the cot roll at an approach angle. As the cutting roll 70 rotates, the angle of the blades 76 changes until the blades 76 engage the cot roll perpendicularly. As the cutting roll 70 continues to rotate, the angle of the blades 76 changes until it reaches a departure angle. The resultant effect of using a cot roll is to dig a wide and deep hole into the cot roll. Since the belt 20 of the invention is flexible and follows the contour of the curved shape of the cutting roll 70, the angle of the blades 76 remains substantially constant with respect to the belt 20, thereby prolonging the life of the blades 76.

If a cot roll 77 is employed, the axis of rotation of a cot roll 77, as shown in FIG. 6, the cutting roll 70 and the cot roll 77 are supported by drive shafts 78 and 79. The shafts 78 and 79 are rotatably mounted on the frame 28. The shafts 78 and 79 rotate on axes that are parallel to one another. Drive means is provided for rotating the shafts 78 and 79. The shafts 78 and 79 are rotated to drive the cutting roll 70 and the cot roll 77. The cot roll 77 is driven in the same direction as the first conveyor belt 20. The cutting roll 70 is driven in the same direction as the second conveyor belt 36. The drive means is also adapted to rotate the cutting roll 70 and the cot roll 77 at substantially equal surface speeds to that of the conveyor belts 20 and 36. It should be appreciated that the drive pulleys 22 and 38, the cutting roll 70, and the cot roll 77 may be driven by the same drive means or by separate drive means.

According to a preferred embodiment of the invention, the drive pulleys 22 and 38 of the first and second conveyor belts 20 and 36 preferably small diameters as compared to the diameter of the idler pulleys 24 and 40. This causes the conveyor belts 20 and 36 to change direction on small turning radii adjacent the exit end of the conveyor belts 20 and 36 and adjacent the chopper 16. Preferably, the small turning radius is less than about 3.0 centimeters. This change in direction reduces the risk that the continuous material 18 will stick to the belts 20 and 36. For example, the idler pulleys 24 and 40 of the first and second conveyor belts 20 and 36 are preferably about eight to ten times smaller that the drive pulleys 22 and 38, providing a ratio greater than about 8:1, and more preferably greater than about 10:1. The change in the direction of the belt 36 is preferably represented by an outside angle θ about the drive pulleys 22 and 38. To simplify the drawings, this angle θ is shown only with respect to the drive pulley 38 in FIG. 3. This angle θ is preferably within the range of from about 120 to about 140 degrees. The ratio of the diameters of the idler pulleys 24 and 40 to the drive pulleys 22 and 38 is preferably. It is most preferable that the small turning radii of the drive pulleys 22 and 38 permit the conveyor belts 20 and 36 to extend to a point within a nip region N of the cutting roll 70 and the cot roll 77, shown in FIG. 6. The nip region N is defined by a line tangent to the outer circumference of both the cutting roll 70 and the cot roll 77.

In accordance with another embodiment of the invention, the position of the cot member and the cutting roll 70 is adjustable relative to one another. For example, the belts 20 and 86 shown in FIGS. 4 and 5 are preferably adjustable to separate the belts 20 and 86 from the cutting roll 70, as shown in phantom in FIGS. 4 and 5. The position of the cutting roll 70 may be similarly adjustable. This separation may be accomplished in any suitable manner. For example, an actuator 80, such as shown in FIG. 1, may be provided for adjusting the position of the shafts 26 and shafts 92 and 94 to adjust the position of the belts 20 and 86. Another actuator 80', also shown in FIG. 1, may be provided for adjusting the position of the cutting roll 70. The actuators 80 and 80' may include air cylinders 82 and 82' and pistons 84 and 84', as shown. The pistons 84 and 84' may be displaceable to adjust the positions of the belts 20 and 86 relative to the cutting roll 70. The positions of the belts 20 and 86 and the cutting roll 70 may be adjustable to vary the pressure of the belts 20 and 86 and the cutting roll 70 against one another or to separate the belts 20 and 86 and the cutting roll 70 from one another, as shown in FIGS. 4 and 5. The embodiment shown in FIG. 4 may require an idler pulley 104 between drive and idler pulleys 22 and 24 for maintaining contact between the first and second conveyor belts 20 and 36 upon separating the first conveyor belt 20 from the cutting roll 70.

Adjustment means may also be provided for adjusting the position of the cutting roll 70 and the cot roll 77 relative to one another. This adjustment means may likewise be in the form of actuators, such as the linear actuators 80 and 80' shown. An actuator 80' for adjusting the position of the cutting roll 70 may be connected between the frame 28 and the cutting roll 70. Similarly, an actuator 80' for adjusting the position of the cot roll 77 may be connected between the frame 28 and the cot roll 77. The positions of the rolls 70 and 77 is preferably adjustable to vary the pressure of the rolls 70 and 77 against one another or separate the rolls 70 and 77 from one another.

The pressure of the belts 20 and 86 against the cutting roll 70 or the rolls 70 and 77 against one another should be sufficient to cut continuous materials 18 yet not so great as to cut through or prematurely wear the belts 20 and 86 or the cot roll 77. The belts 20 and 86 or cot roll 77 and the cutting roll 70 are preferably adapted to be separated sufficiently to provide a clear path for continuous materials 14 to pass between the belts 20 and 86 or the cot roll 77 and the cutting roll 70 without interference from the belts 20 and 86 or the cot roll 77 and the cutting roll 70 with the continuous material 18. During periods of separation, the cot belt 86 or the cot roll 77 and the cutting roll 70 may be adapted for continued rotation at a surface speed equivalent to the surface speed of the conveyor belts 20 and 36 to reduce the risk of interference with the continuous material 18.

When the positions of the belts 20 and 86 or the cot roll 77 and the cutting roll 70 are adjusted so that the belts 20 and 86 or the cot roll 77 engage the cutting roll 70, the belts 20 and 86 or the cot roll 77 and the cutting roll 70 cooperate to produce chopped materials 81. When the positions of the belts 20 and 86 or the cot roll 77 and the cutting roll 70 are adjusted to separate the belts 20 and 86 or the cot roll 77 and the cutting roll 70 from one another, continuous materials 18 may be passed between the belts 20 and 86 or the cot roll 77 and the cutting roll 70 and collected on a collection surface downstream of the chopper 16. Hence, the apparatus 10 according to the instant invention is adapted for use in guiding and collecting uncut continuous materials 18 or producing chopped materials 81.

Figure 7:
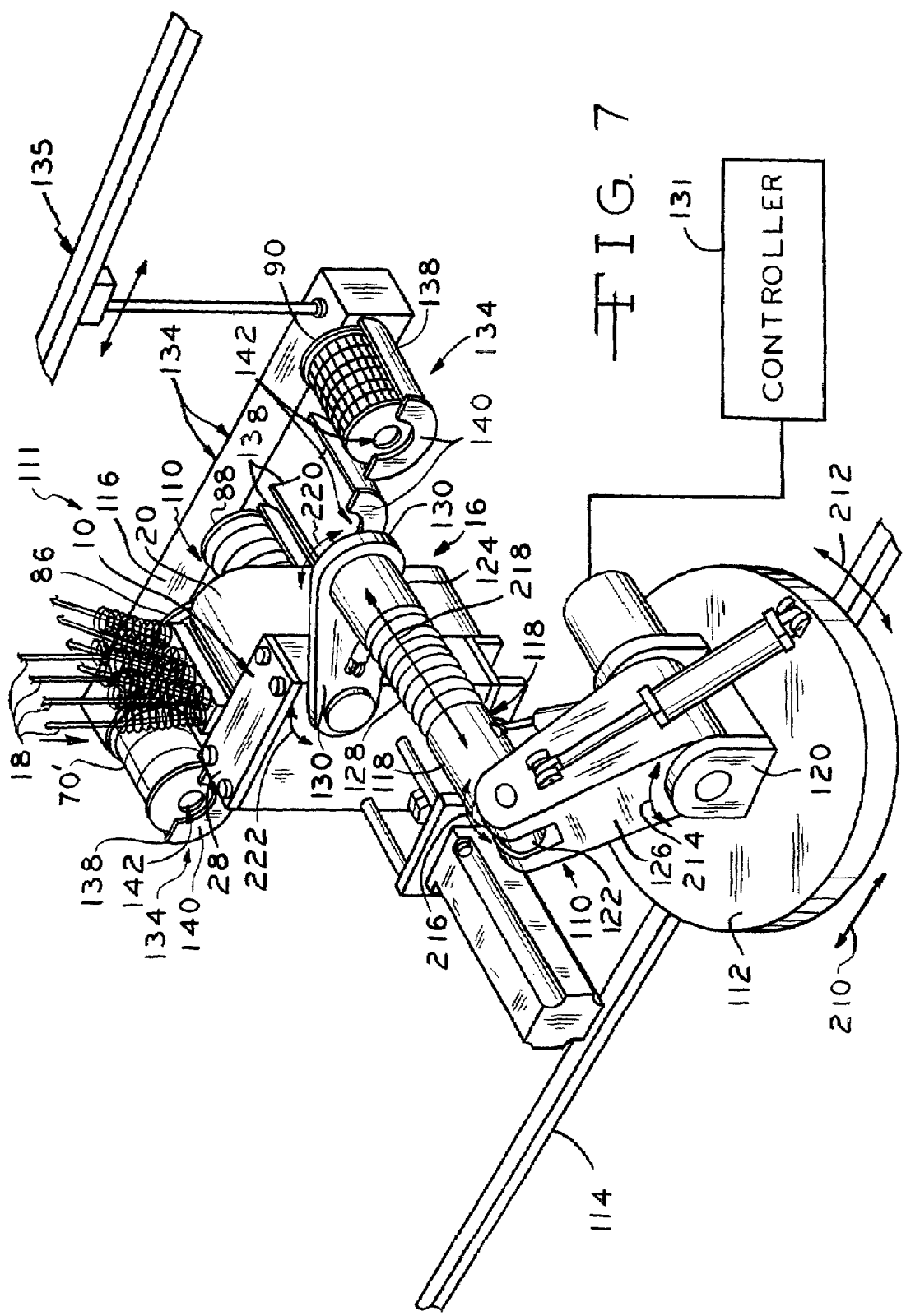
FIG. 7 is a rear perspective view of the apparatus according to the invention
Figure 8:
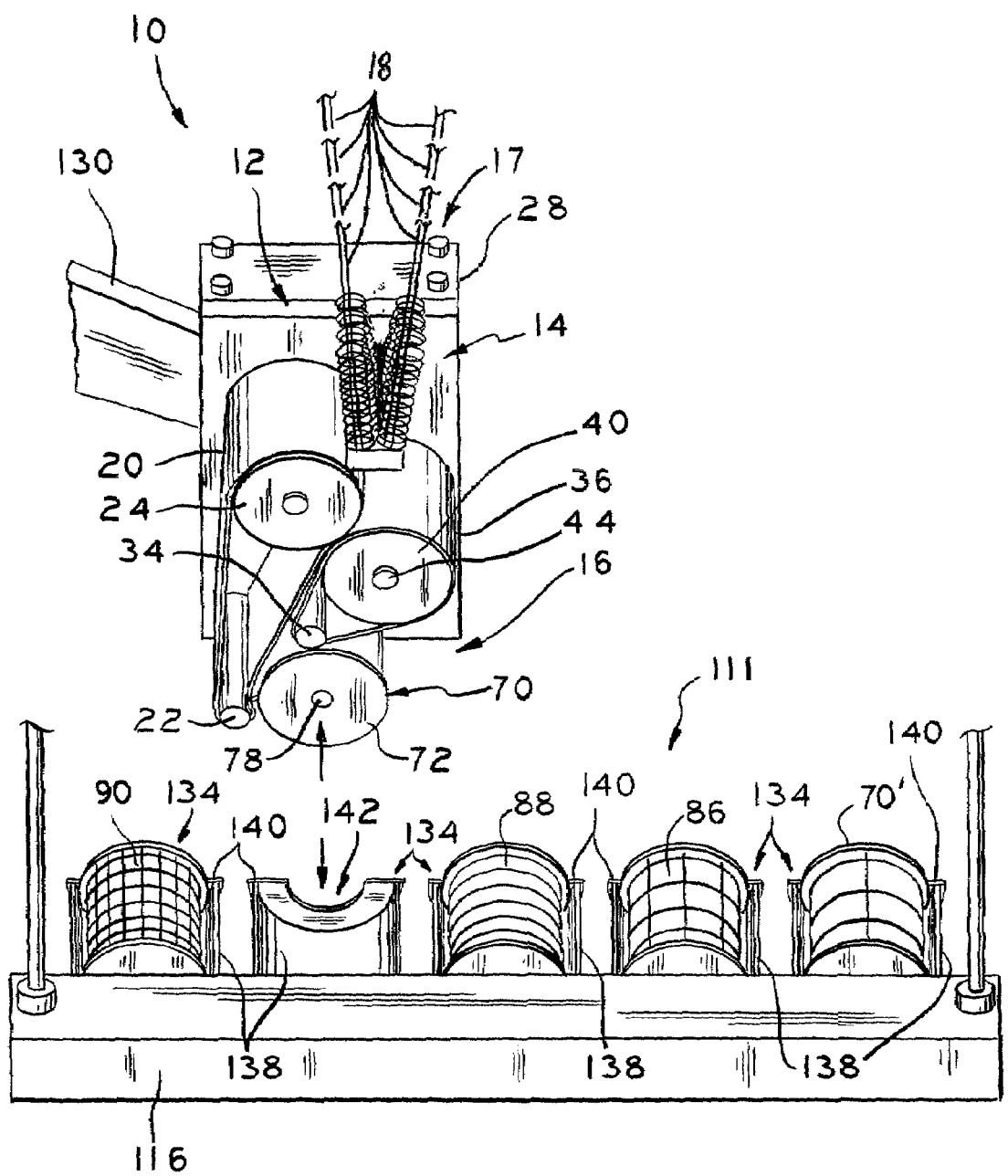
FIG. 8 is a partial front perspective view of the apparatus shown in FIG. 7.

As shown in FIGS. 7 and 8, the frame 28 may be mounted for movement relative to a supporting surface. Hence, the conveyors 12, 14 and the chopper 16 may be displaced or moved simultaneously. This may be carried out in any suitable manner. For example, a mechanical arm, such as the arm generally indicated at 110, may be provided for supporting and displacing the frame 28.

The mechanical arm 110 may be supported by a mobile platform, such as the platform generally indicated at 112. The mobile platform 112 may be adapted to travel in opposing directions, as indicated by arrow 210, along a track 114. The platform 112 may also be adapted to rotate in opposing direction, as indicated by arrow 212, relative to the track 114.

The mechanical arm 110 may include a servo-linkage arm, such as the linkage 118 shown. The linkage, in turn, may include one or more joints, such as a shoulder joint 120, an elbow joint 122, and a wrist joint 124. Intermediate arms 126, 128, and 130 may join the various joints 120, 122, and 124 together and enable the servo-linkage arm 118 have a great amount of freedom of movement in various direction, as indicated by arrows 214, 216, 218, 220, and 222. The frame 28 is adapted to move in correspondence with movement of the arm 110.

It should be appreciated that the servo-linkage arm 118 may be of conventional construction. It is well within the purview of those of average skill in the art to provide a computer or microprocessor controller 131 and mechanism to accomplish the desired movements and positions of the frame 28. It should be understood that other means for moving the frame 28 in a time sequence or other prescribed motion may be utilized and that the present invention is not intended to be limited to the mechanical arm 110 shown. Movement of the frame 28 is advantageous in that such movement permits uncut continuous material 18 or chopped material 81 to be collected in a desired pattern downstream of the frame 28.

A storage rack 116 may be located in the vicinity of the mechanical arm 110. The storage rack 116 may include a plurality of carriers 134. The carriers 134 may be supported on a conveyor 135. The carriers 134 are provided for storing fresh or different cutting rolls 70', 86, 88, and 90. Each carrier 134 may include an upwardly open, partially cylindrical carriage 138 for providing vertical support for the stored cutting rolls 70', 86, 88, and 90. An end plate 140 defining a partially circular opening 142 may be attached to the carriage 138. The end plate 140 is provided for axially bounding the stored cutting rolls 70', 86, 88, and 90. The opening 142 is provided for receiving the cutting roll shaft 78.

The mechanical arm 110 is operable to displace the frame 28 between an operating position and a storage and retrieval position. In the operating position, the chopper 16 is operable to collect continuous materials 18 or produce chopped materials 81. In the storage and retrieval position, an operable cutting roll 70 may be stored and a fresh or different cutting roll 70', 86, 88, and 90 may be retrieved from a storage station or area 111 where the storage rack 116 is located. This permits a cutting roll 70, which is in use, to be replaced by a fresh identical cutting roll 70' or a different cutting roll 86, 88, or 90 that is suitable for producing different chopped materials 81. This operation can be performed automatically, resulting in an automatic doffing operation.

In operation, continuous materials 18 are fed between the first and second conveyor belts 20 and 36. The conveyor belts 20 and 36 discharge the continuous materials 18 into a nip region N between the cutting roll 70 and the cot member. When the cutting roll 70 and the cot member engage one another, the cutting roll 70 and the cot member cooperate to produce chopped materials 81. The chopped materials 81 are discharged downstream of the chopper 16.

Figure 9:
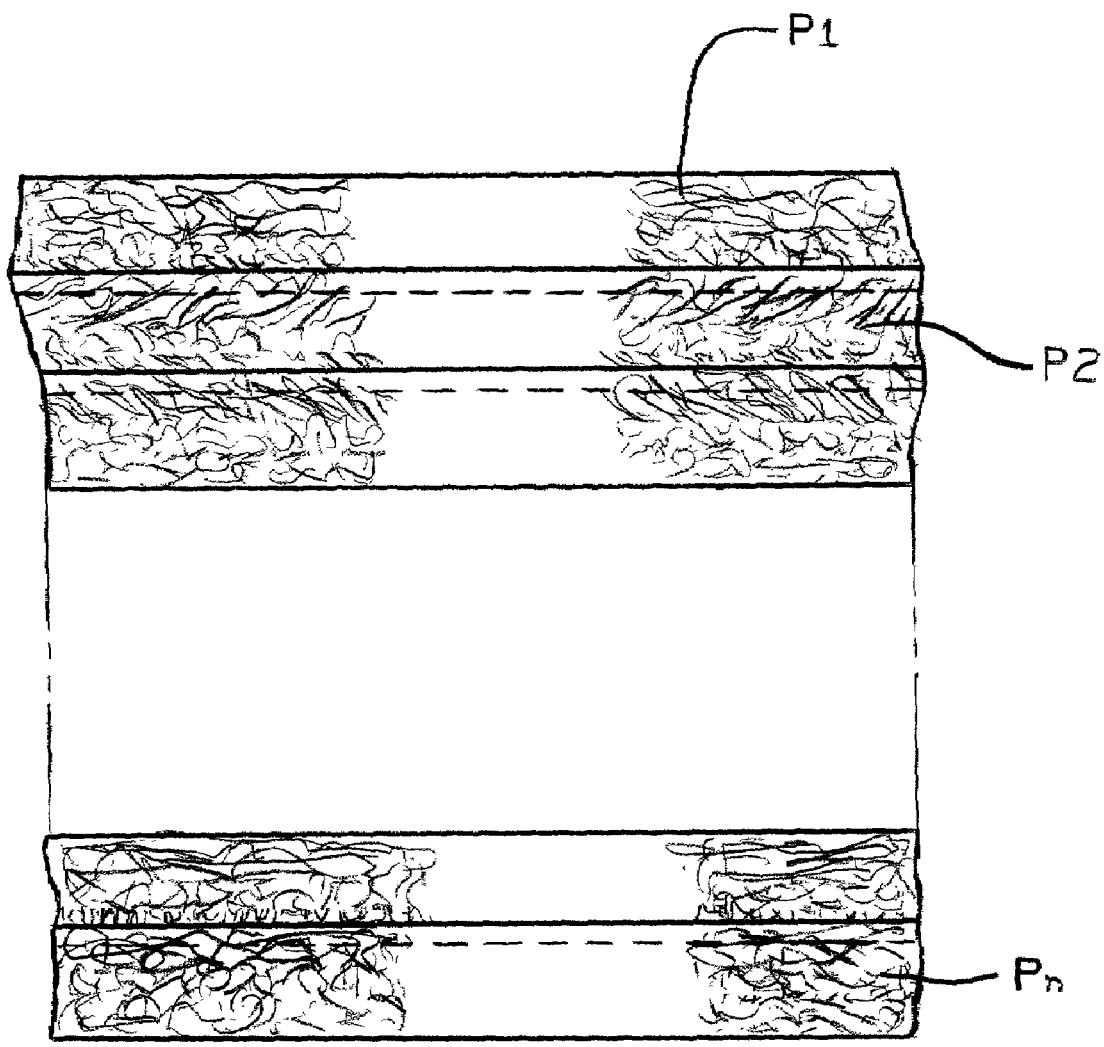
FIG. 9 is a plan view diagrammatically showing a pattern of materials discharged by the present invention.

In a chopping operation, it is often desirable to arrange randomly distributed chopped materials 81 in a desired pattern. For example, in a structural reinforced injection collection surfacing process, commonly referred to as an S-RIM process, randomly distributed chopped materials are arranged in overlapping paths, similar to the paths P1, P2, . . . Pn shown in FIG. 9. The apparatus 10 according to the invention may produce chopped material 81 as the mechanical arm 110 moves along a first path P1. When the first path P1 is completed, the mechanical arm 110 may move the frame 28 of the apparatus 10 in a direction transverse to the first path P1 and start a second path P2. The paths P1 and P2 may overlap if desired. This operation may continue until the last desired path Pn is laid.

It should be appreciated by skilled in the art that the collection surface may be perforated and further that the material may be held in place on the collection surface by a vacuum that draws air through the perforations in the collection surface. It should also be understood that the collection surface may be horizontally disposed, vertically disposed, or disposed at some other angle.

The apparatus 10 is also operable to discharge uncut continuous material 18. It is often desirable to arrange randomly distributed chopped materials 81 in a desired pattern with uncut continuous materials 18. The apparatus 10 according to the invention may be controlled to arrange randomly distributed chopped material 18 in a desired pattern while periodically separating the cutting roll 70 and the cot member to discharge uncut continuous materials 18. The resultant effect is to produce a mixture of uncut and chopped materials. The mixture may be layered as desired.

It should be appreciated by one of ordinary skill in the art that uncut continuous materials 18 may be collected on a collection surface, even in the absence of chopped materials 18. To this end, the present invention is an apparatus 10 for use in collecting uncut continuous materials 18 and producing chopped materials 81. Moreover, the apparatus 10 is for use in producing a composite of uncut continuous materials 18 and producing chopped materials 81.

The automatic doffing operation permits an operable cutting roll 70 (i.e. the cutting roll being used) to be removed from the cutting roll shaft 78 automatically by first depositing the cutting roll 70 into a designated one of the carriers 134 and then withdrawing the cutting roll shaft 78 by displacing the chopper 16 so that the cutting roll shaft 78 moves axially relative to the cutting roll 70. A fresh cutting roll 70' or a different cutting roll 86, 88, or 90 may be removed from one of the carriers 134 by displacing the chopper 16 so that the cutting roll shaft 78 is axially inserted into a designated cutting roll 70', 86, 88, or 90. The designated cutting roll 70', 86, 88, or 90 is then lifted out of its corresponding carrier 134 by lifting the chopper 16. The chopper 16 subsequently returns to an operating position wherein continuous materials 18 may be conveyed to the chopper 16 and chopped into chopped materials 81.

Figure 10:
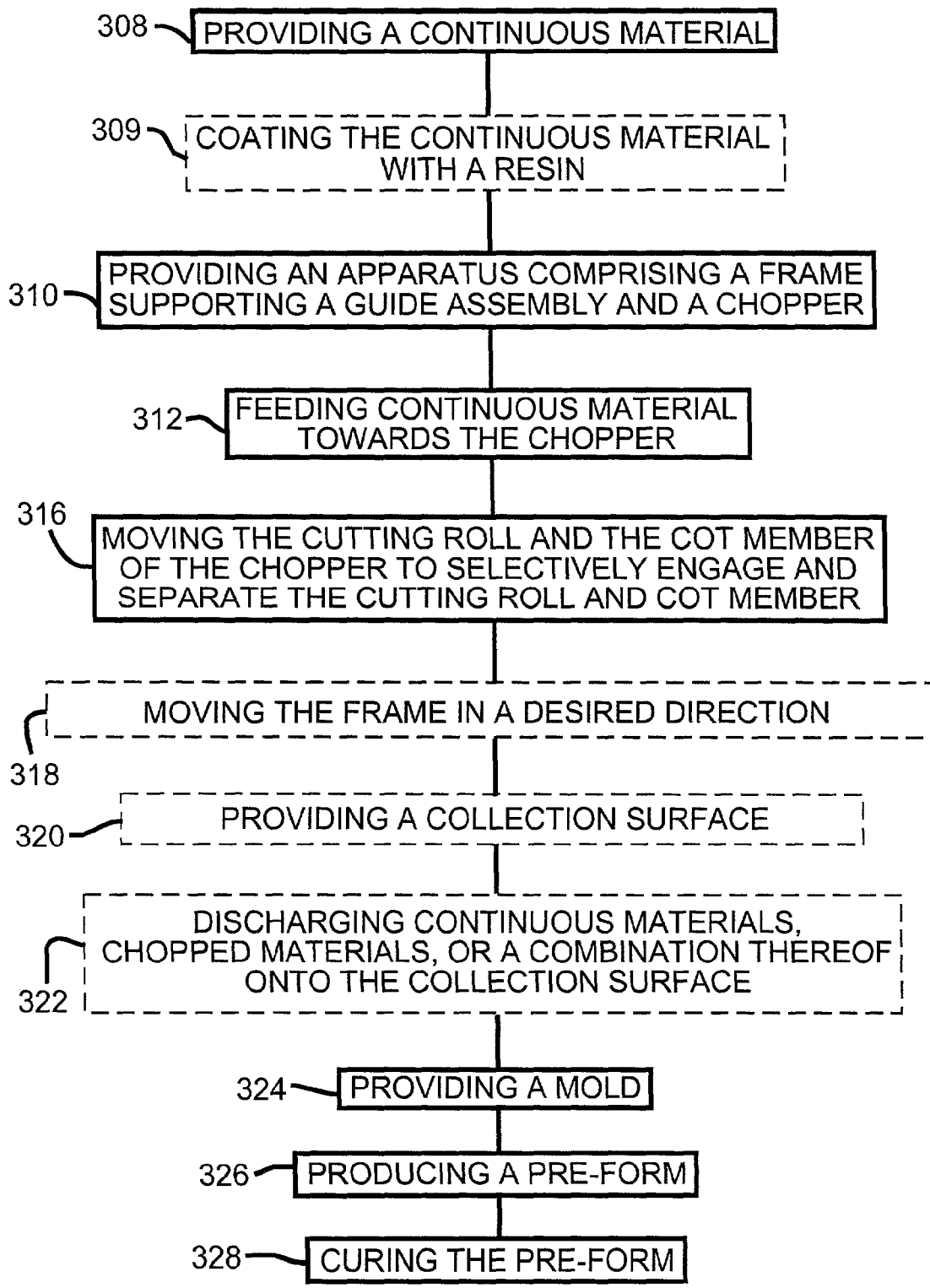
FIG. 10 is a flow chart representing functional steps according to a method of the present invention.

Now with reference to FIG. 10, a method is provided for collecting uncut continuous materials and producing chopped materials. The method is comprised of the functional step 308 of providing a continuous material. In an optional coating step 309, the continuous material is coated with a thermoplastic resin. In a providing step 310, an apparatus comprised of a frame supporting a conveyor and a chopper is provided. In a feeding step 312, continuous materials are fed, preferably by the conveyor, toward the chopper. In a moving step 316, both the cutting roll and the cot member are moved to selectively engage the cutting roll and cot member to chop the continuous material, and to selectively separate the cutting roll and cot member to permit continuous materials to pass between the cutting roll and the cot member without cutting the continuous materials. In a frame moving step 318, the frame supporting the conveyor and chopper is moved in a desired direction.

According to one method of the invention, a functional step 320 includes providing a collection surface downstream of the apparatus provided in the apparatus providing step 310 set forth above. In a discharging step 322, the continuous materials, the chopped materials, or a combination thereof are collected or discharged onto the collection surface. The discharging step 322 and the frame moving step 318 may be performed simultaneously as desired to produce a composite of continuous and chopped material. In an optional step 324, the collection surface is a perforated collection surface provided downstream of the chopping apparatus, and a vacuum or suction is applied to pull the continuous or chopped materials into the collection surface. In a subsequent optional step 326, a compaction screen compresses the continuous or chopped materials against the collection surface to produce a preform. In a curing step 328, the collection surface, the compaction screen, and the preform therebetween are heated in an oven until the thermoplastic resin melts and sets up to glue the continuous or chopped materials together. The curing step 328 is followed by a cooling step wherein the collection surface, the compaction screen, and the glued continuous or chopped materials are permitted to cool. Following the cooling step, the glued continuous or chopped materials are removed from between the collection surface and the compaction screen, producing a preform.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus for guiding continuous materials, comprising:
    a first conveyor comprised of a first continuous conveyor belt having an inner surface, the first conveyor being carried by a first set of pulleys including a drive pulley and an idler pulley;
    a second conveyor comprised of a second continuous conveyor belt having an inner surface that is substantially parallel to the inner surface of the first conveyor belt, the second conveyor belt being carried by a second set of pulleys including a drive pulley and an idler pulley, the conveyor belts being oriented to sandwich continuous materials therebetween; and
    a chopper comprising a cutting roll and a cot roll defining a nip region therebetween, the drive pulley of each of the sets of pulleys having a small turning radius that permits the conveyor belts to extend within the nip region.

2. The apparatus according to claim 1, wherein the drive pulleys and the idler pulleys each has a diameter, wherein a ratio of the diameters of the idler pulleys to the drive pulleys is greater than about 8:1.

3. The apparatus according to claim 1, wherein the cutting roll is rotatably mounted on an axis of rotation and the cot roll is rotatably mounted on an axis of rotation that is substantially parallel to the axis of rotation of the cutting roll, the drive pulleys being closest to the cutting roll and the cot roll.

4. An apparatus for guiding continuous materials, comprising:
    a first conveyor comprised of a first continuous conveyor belt carried by a first set of pulleys including a drive pulley and an idler pulley, at least one pulley of the first set of pulleys having a small turning radius;
    a second conveyor comprised of a second continuous conveyor belt in a substantially parallel spaced relation to the first conveyor belt, the second conveyor belt being carried by a second set of pulleys including a drive pulley and an idler pulley, at least one pulley of the second set of pulleys having a small turning radius, the conveyor belts having portions that are oriented to travel substantially parallel to one another to sandwich the continuous materials therebetween; and a chopper comprising a cutting roil and a cot roll defining a nip region therebetween, the small turning radii permitting the conveyor belts to extend within the nip region, the conveyor belts extending within the nip region.

5. The apparatus according to claim 4, wherein the drive pulleys and the idler pulleys each have a diameter, and wherein a ratio of the diameters of the idler pulleys to the drive pulleys is greater than about 8:1.

6. An apparatus for guiding continuous materials, comprising:
   a first conveyor comprised of a first continuous conveyor belt having an inner surface, the first conveyor being carried by a first set of pulleys; and
   a second conveyor comprised of a second continuous conveyor belt having an inner surface that is substantially parallel to the inner surface of the first conveyor belt, the second conveyor belt being carded by a second set of pulleys, the conveyor belts being oriented to sandwich continuous materials therebetween from a first end of the conveyor to a second end of the conveyor; and
   a chopper comprising a cutting roll and a cot roll defining a nip region therebetween, the drive pulley of each of the sets of pulleys having a small turning radius that permits the conveyor belts to extend within the nip region.

7. The apparatus according to claim 6, wherein a pulley of the first conveyor adjacent a first end of the first conveyor has a first diameter and a pulley of the first conveyor adjacent a second end thereof has a second diameter, wherein a ratio of the first diameter to the second diameter is greater than about 8:1.

8. The apparatus according to claim 7, wherein a pulley of the second conveyor adjacent a first end of the second conveyor has a first diameter and a pulley of the second conveyor adjacent a second end thereof has a second diameter, wherein a ratio of the first diameter to the second diameter is greater than about 8:1.

9. The apparatus according to claim 6 wherein the cutting roll rotatably amounted on an axis of rotation and the cot roll is rotatably mounted on an axis of rotation that is substantially parallel to the axis of rotation of the cutting roll, the drive pulleys being closest to the cutting roll and the cot roll.

* * * * *